United States Patent
Athans et al.

(10) Patent No.: US 7,121,802 B2
(45) Date of Patent: Oct. 17, 2006

(54) SELECTIVELY THINNED TURBINE BLADE

(75) Inventors: Robert Edward Athans, Cincinnati, OH (US); Brian Alan Norton, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/889,838

(22) Filed: Jul. 13, 2004

(65) Prior Publication Data

US 2006/0013691 A1    Jan. 19, 2006

(51) Int. Cl.
*F01D 5/16*    (2006.01)

(52) U.S. Cl. .................. 416/193 A; 416/239; 416/500

(58) Field of Classification Search ............ 416/193 A, 416/239, 500
See application file for complete search history.

(56) References Cited

U.S. PATENT DOCUMENTS

| | | | |
|---|---|---|---|
| 3,112,914 A | | 12/1963 | Wellman |
| 4,505,642 A | * | 3/1985 | Hill .................. 416/193 A |
| 4,872,812 A | | 10/1989 | Hendley et al. |
| 4,936,749 A | | 6/1990 | Arrao et al. |
| 5,108,261 A | * | 4/1992 | Ress et al. .................. 416/190 |
| 5,201,849 A | | 4/1993 | Chambers et al. |
| 5,388,962 A | | 2/1995 | Wygle et al. |
| 5,924,699 A | | 7/1999 | Airey et al. |
| 6,171,058 B1 | | 1/2001 | Stec |
| 6,269,540 B1 | | 8/2001 | Islam et al. |
| 6,932,575 B1 | * | 8/2005 | Surace et al. ........... 416/193 A |
| 2002/0187039 A1 | | 12/2002 | Rinok et al. |
| 2005/0079062 A1 | | 4/2005 | Surface et al. |

FOREIGN PATENT DOCUMENTS

EP    0 437 977 A1    7/1991
EP    0 913 556    5/1999

OTHER PUBLICATIONS

GE Aircraft Engines, "Stage-two Turbine Blade," in public use and on sale in USA and world before Jun. 1, 2003, 9 figures.

* cited by examiner

Primary Examiner—Ninh H. Nguyen
(74) Attorney, Agent, or Firm—Stephen H Friskney; Francis L. Conte

(57) ABSTRACT

A turbine blade includes an airfoil, platform, shank, and dovetail. The platform includes a first side disposed along the pressure side of the airfoil, and an opposite second side disposed along the airfoil suction side. The platform second side includes an integral damper keeper disposed below the midchord of the airfoil, and is locally thinner at the forward and aft ends of the platform second side for reducing blade weight.

27 Claims, 5 Drawing Sheets

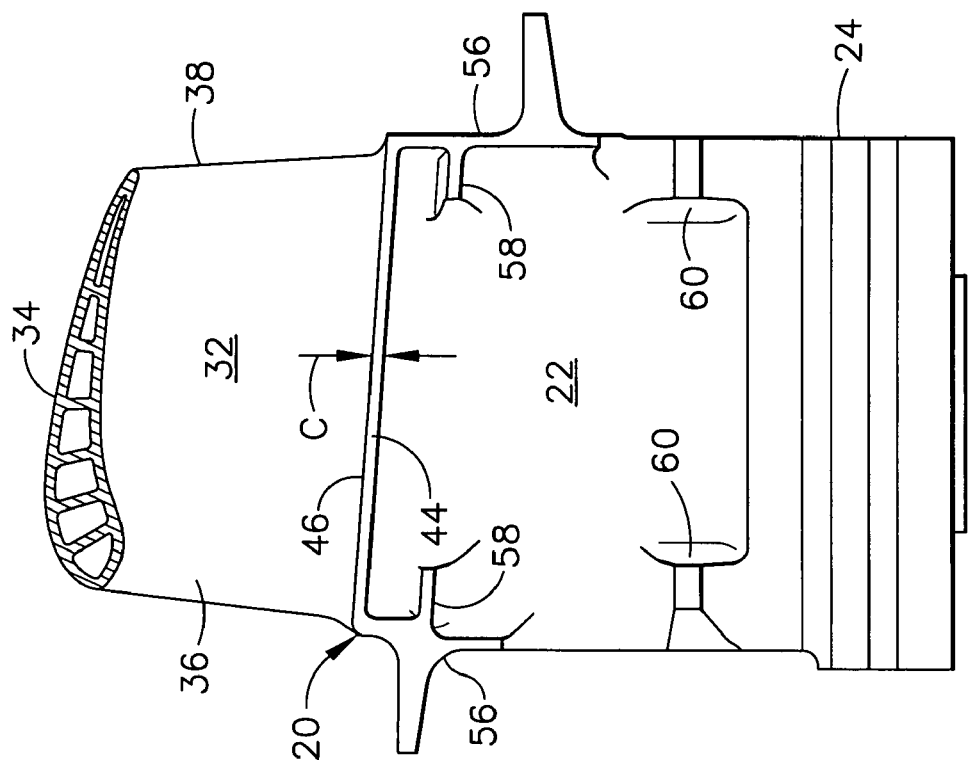
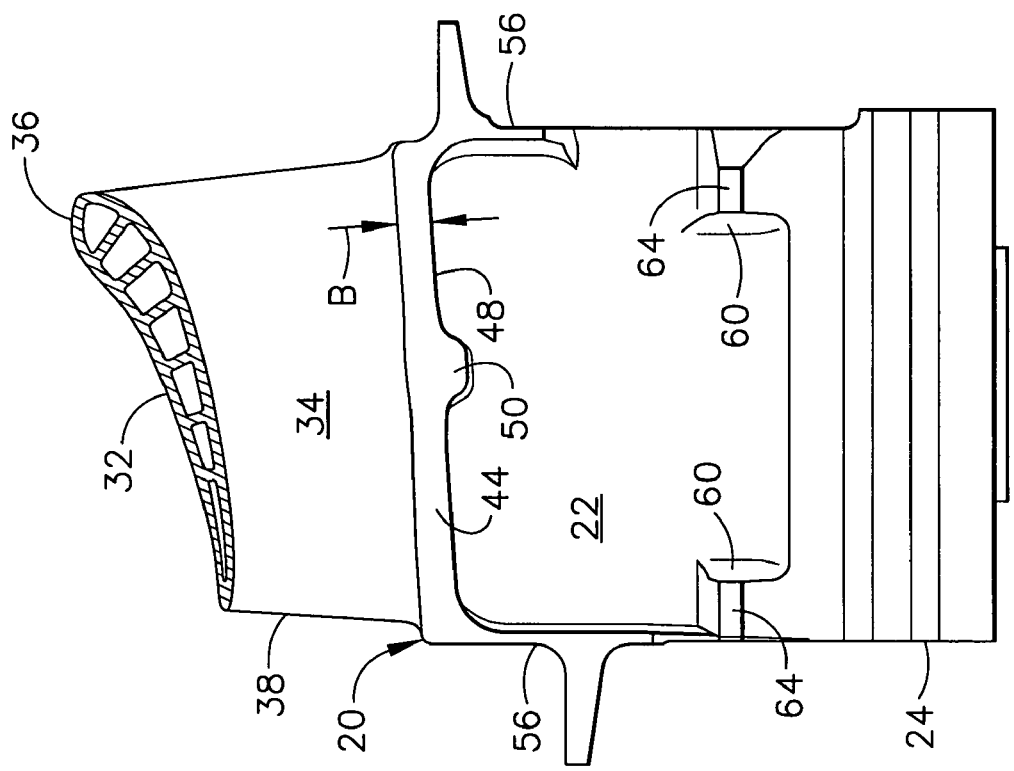

SELECTIVELY THINNED TURBINE BLADE

BACKGROUND OF THE INVENTION

The present invention relates generally to gas turbine engines, and, more specifically, to turbine blades therein.

In a gas turbine engine air is pressurized in a compressor and mixed with fuel in a combustor for generating hot combustion gases. Turbine stages extract energy from the combustion gases for powering the compressor and producing useful work.

A high pressure turbine (HPT) immediately follows the combustor and includes one or more rows of turbine rotor blades which extract energy from the gases for powering the compressor.

A multistage low pressure turbine (LPT) follows the HPT and includes additional rotor blades which also extract energy from the combustion gases for typically powering an upstream fan in a turbofan aircraft engine application.

In yet another configuration, an intermediate pressure turbine (IPT) is disposed between the HPT and the LPT and includes additional turbine stages which also extract energy from the combustion gases for producing additional work. In this configuration, the IPT may be joined to a low pressure or booster compressor disposed upstream from the high pressure compressor for providing power thereto. And, the LPT powers an external drive shaft which may be used for powering an electrical generator in a typical industrial gas turbine engine application.

Since the rotor blades of the HPT are subject to the hottest temperatures of the combustion gases and rotate at high speed they are subject to considerable thermal and centrifugal stresses during operation. In order to improve their life and durability, the HPT turbine blades are typically formed of superalloys, such as nickel-based metal, for their enhanced strength at elevated temperature.

The turbine blades typically include hollow airfoils having cooling circuits therein through which is circulated cooling air bled from the compressor during operation. The blades also include an integral platform which defines the inner boundary for the hot combustion gases, with an integral supporting dovetail being disposed therebelow.

The blade dovetail includes one or more pairs of dovetail tangs or lobes which are mounted in corresponding dovetail slots in the perimeter of the supporting turbine rotor disk. Axial-entry dovetails are common and extend through axial dovetail slots disposed around the perimeter of the rotor disk.

Centrifugal loads generated during operation of the rotating blades are carried radially inwardly through the dovetail lobes into the corresponding disk posts which define the dovetail slots around the perimeter of the rotor disk Since the blade airfoil, platform, and dovetail are specifically configured for different purposes they experience different thermal and centrifugal loads during operation which must be suitably limited for ensuring a long useful life of the turbine stage.

Correspondingly, the supporting rotor disks must also be suitably configured for carrying the centrifugal loads from the row of rotor blades with limited stress for ensuring the long useful life of the disk as well.

Turbine efficiency is affected by many interrelated parameters. Fundamentally, turbine efficiency may be increased as combustion gas temperature increases, but hotter combustion gases increase the heat loads on the turbine components which must be suitably cooled. Bleeding cooling air from the compressor in turn reduces efficiency of the engine since the bleed air is not used in the combustion process.

Furthermore, the aerodynamic profiles of the turbine blades themselves affect engine efficiency, and the airfoil configuration also affects thermal and centrifugal loads and stresses not only in the airfoils themselves but also in the supporting platforms, dovetails, and rotor disk posts.

In a recent development of a three-spool industrial gas turbine engine having an HPT, IPT, and LPT for driving an electrical generator, engine efficiency is being increased by improving the 3-D aerodynamic configuration of the turbine airfoils in the second stage of the HPT, for example. Modern analysis tools are being used to refine the 3-D configuration of the second stage airfoil for improving the efficiency thereof, which blades experience a larger twist relative to the axial dovetails then conventionally found. Such axial dovetails have proven durability in conventional turbines and permit corresponding long life of the supporting rotor disk.

The increased twist or turning of the airfoil root or hub at the inner platform correspondingly changes the load paths to the axial dovetail which is not similarly twisted or turned about the radial axis.

The airfoil hub turning requires suitably inclined or angled axial splitlines between the adjacent platforms in the row of turbine blades. The blade platforms therefore are twisted relative to the supporting axial dovetail and affect the centrifugal load path therethrough as well as the collective configuration thereof.

Each platform includes two slash faces which define the corresponding axial split lines between adjacent platforms when mounted in a full row around the perimeter of the rotor disk. Twisting of the platform then causes corresponding corners thereof at the forward and aft ends of the platform to overhang the underlying axial dovetail in a cantilever fashion.

The overhanging corners of the platform are therefore relatively long as compared with the midchord region of the platform at which the twisting direction changes, with the opposite corners of the platforms being offset back or recessed behind the corresponding edges of the axial dovetail.

The twisted platform can add significant weight to the entire blade because the platform is typically configured relatively thick at its aft and forward ends to define corresponding damper keepers. In one conventional configuration, the two damper keepers are located on the suction-side slash face of the platform at the junction with the corresponding radially extending skirts which support conventional angel wing seals.

The pressure-side slash face is relatively thin and includes a shelf therebelow for mounting an elongate damper therein. The damper is trapped axially, radially, and circumferentially between adjoining platforms when assembled along the perimeter of the rotor disk, and includes a planar flat face which circumferentially abuts the suction-side slash face, including the two damper keepers integral therewith.

In this way, the enlarged damper keepers maintain the radial orientation of the dampers during operation for maximizing their damping performance as they vibrate between the platforms during operation for frictionally damping vibratory motion of the blades.

Since the two damper keepers are located at the forward and aft ends of the platform in the overhang regions thereof, they add considerable weight to the turbine blades, which correspondingly increases the centrifugal force which must be carried through the dovetails and into the rotor disk, and correspondingly increase stress therefrom.

Furthermore, additional weight is introduced in the turbine blade by the need for providing therein a pair of reference planes or datum pads. A typical turbine blade is initially cast, and then undergoes subsequent machining as required for finishing the blade, such as by drilling many film cooling holes through the airfoil thereof.

In one conventional turbine blade, four supporting lugs extend outwardly from the blade shank above the dovetail on opposite sides of the blade, and support a discrete seal body thereon during operation. Two of the supporting lugs have recessed datum pads on the inboard sides thereof which pads are locally thick regions of the blade shank that rise in elevation to form a common reference plane for subsequent machining operations. Those two datum pads add weight to the blade.

Yet further, individual blades typically include a corresponding serial number therefor. The serial number is typically formed on a corresponding flat pad formed on the pressure side of the blade shank between the other two supporting lugs. That pad is a flat land elevated from the changing contour of the shank, and adds additional weight to the turbine blade.

The entire weight of the turbine blade must be carried through its dovetail into the disk posts of the turbine rotor and creates corresponding centrifugal force and stress which must be carried by the common supporting disk.

In order to ensure the durability and long life of the turbine disk which supports a full row of turbine blades, the disk is typically formed of a superalloy material, nickel based for example, which enjoys high strength in the hot environment of the turbine. Disk strength may be further increased by using state-of-the-art manufacturing processes such as powder metallurgy to form the disk in a correspondingly expensive manufacturing process. Powder-formed turbine rotor disks enjoy increased strength over conventional forged disks, but at a correspondingly higher manufacturing cost.

Accordingly, it is desired to provide an improved turbine blade having selective weight reduction for decreasing centrifugal loads during operation, and permitting the use of a less expensive supporting rotor disk for achieving comparable durability and life.

BRIEF DESCRIPTION OF THE INVENTION

A turbine blade includes an airfoil, platform, shank, and dovetail. The platform includes a first side disposed along the pressure side of the airfoil, and an opposite second side disposed along the airfoil suction side. The platform second side includes an integral damper keeper disposed below the midchord of the airfoil, and is locally thinner at the forward and aft ends of the platform second side for reducing blade weight.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 5 is a suction-side elevational view of the platform region of the blade illustrated in FIG. 2.

FIG. 6 is pressure-side elevational view of the platform region of the blade illustrated in FIG. 2.

DETAILED DESCRIPTION OF THE INVENTION

Figure 1:
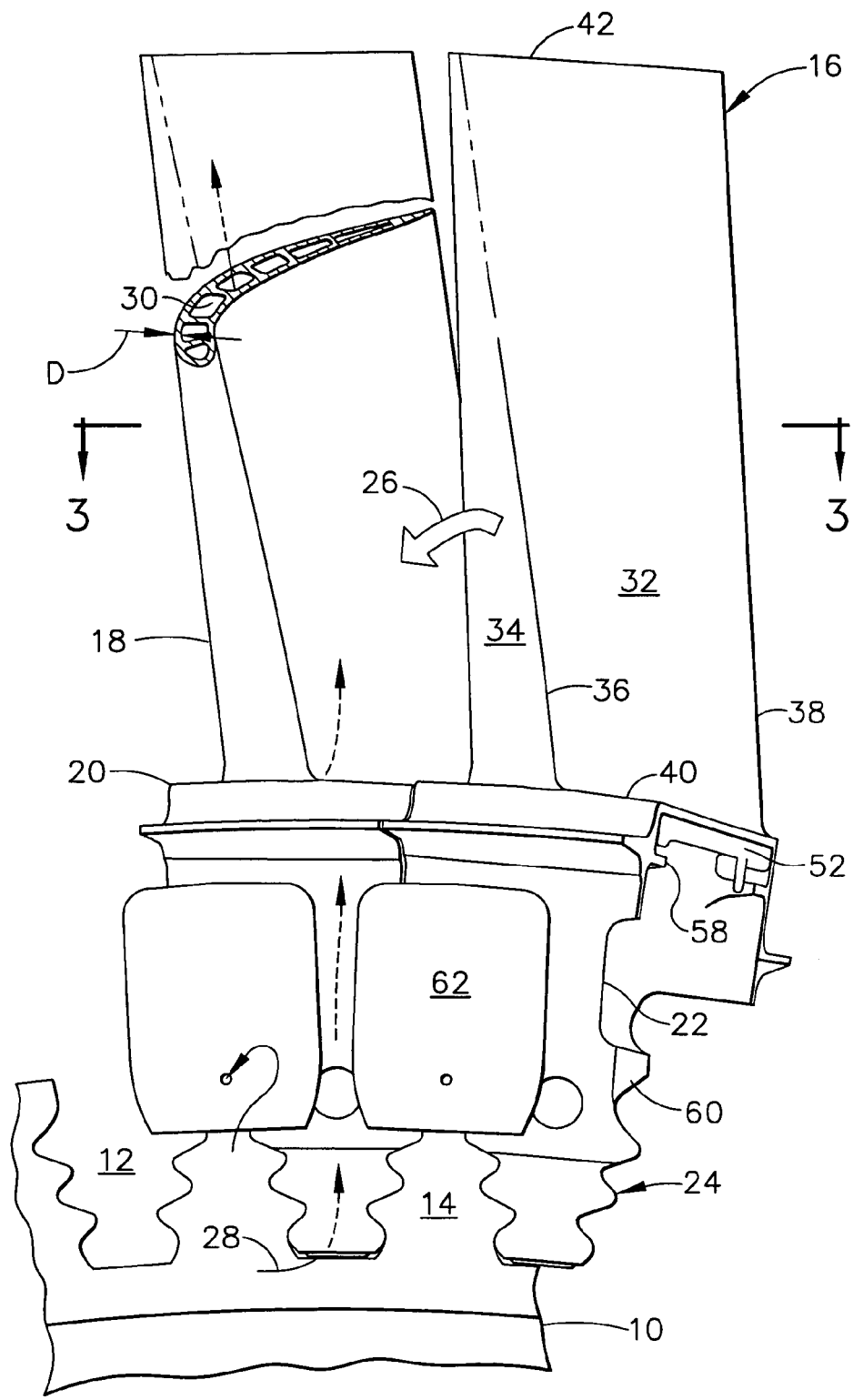
FIG. 1 is a forward-facing-aft elevational view of a portion of a second stage turbine rotor including rotor blades extending radially outwardly from a supporting rotor disk.

FIG. 1 illustrates a representative portion of a second stage turbine rotor of an HPT for an otherwise conventional gas turbine engine. The engine may be configured as a turbofan for powering an aircraft in flight, or for marine or industrial applications with an LPT driving an external drive shaft.

A turbine rotor disk 10 is shown in part and includes a row of axial dovetail slots 12 formed around the perimeter of the disk and defined by complementary disk posts 14.

A row of second stage turbine rotor blades 16 is mounted around the rotor disk in the corresponding dovetail slots 12. Each blade includes an airfoil 18, platform 20, shank 22, and multilobe axial dovetail 24 integrally joined together radially in turn in a unitary or one-piece casting.

During operation, hot combustion gases 26 are generated in a combustor (not shown) and are suitably channeled between the turbine airfoils 18 which extract energy therefrom for rotating the disk 10. The disk is suitably joined by a shaft to a multistage axial compressor (not shown) that pressurizes air 28 which is mixed with fuel in the combustor for generating the hot combustion gases.

A portion of the pressurized air 28 is suitably channeled to the rotor disk 10 and delivered in the disk slots 12 to the individual turbine blades for flow radially outwardly therethrough in cooling circuits 30 suitably formed therein during the casting process.

The individual airfoils 18 are therefore hollow and include suitable partitions or ribs therein for defining the various legs of the cooling circuit 30 for cooling the airfoil in any conventional manner. The cooling circuits include inlet channels which extend inwardly through the blade platform, shank, and dovetail, with inlets formed in the base of the dovetail for initially receiving the pressurized cooling air therein, also in a conventional manner.

Figure 2:
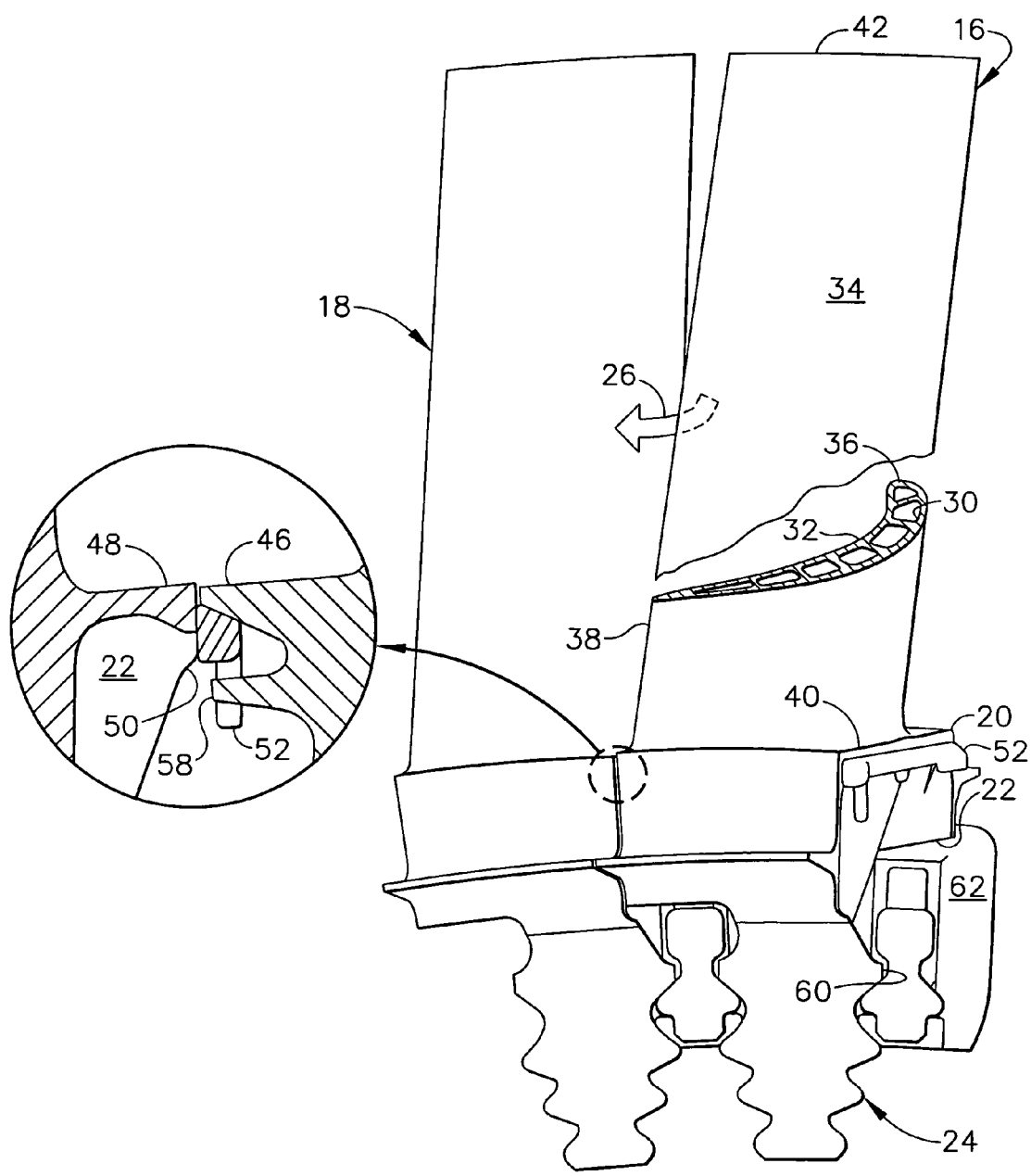
FIG. 2 is a aft-facing-forward elevational view of the turbine blades illustrated in FIG. 1.
Figure 3:
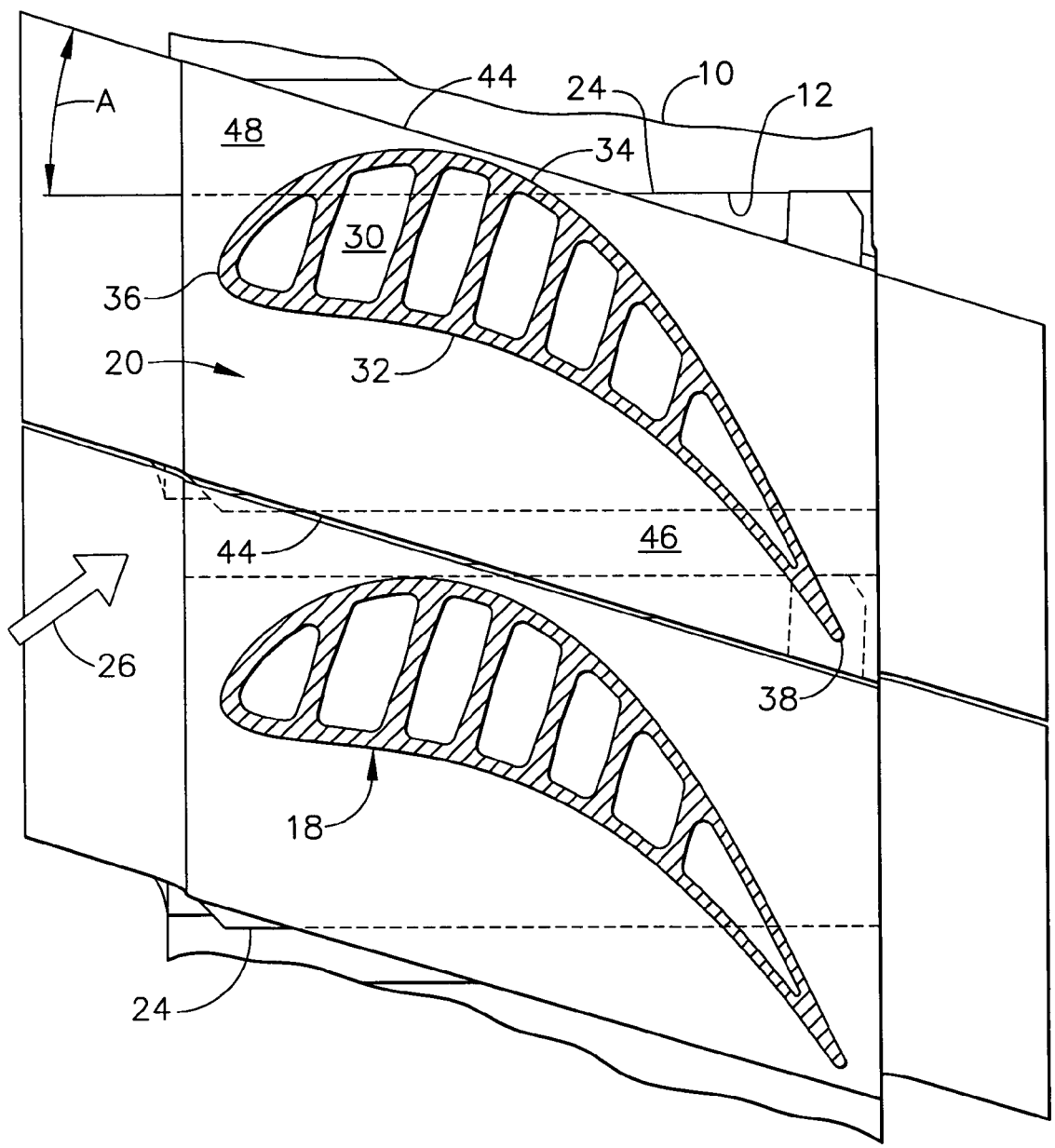
FIG. 3 is a partly sectional, planiform view of the two blades illustrated in FIG. 1 and taken along line 3—3.

As shown in FIGS. 2 and 3, each airfoil 18 includes a generally concave pressure side 32 and a circumferentially or laterally opposite, generally convex suction side 34. The two sides extend axially in chord between opposite leading and trailing edges 36,38, and in longitudinal or radial span between a hub or root 40 integrally formed at the platform and an outer tip 42 at the distal end of the airfoil.

Except as described hereinbelow, the basic second stage turbine blade illustrated in FIGS. 1–3 is conventional in configuration and operation and is similarly found in commercial turbine engines sold and used for many years both in the U.S. and globally. As indicated above, further advances in efficiency of this stage-two turbine blade may be effected by improving the 3-D aerodynamic configuration of the airfoil 18.

More specifically, modern computational analysis may be used for improving the 3-D configuration of the airfoil 18 illustrated in FIGS. 1–3 to include, for example, increased turning or twist around the radial centerline or stacking axis of the airfoil. FIG. 3 illustrates in particular that the airfoil may be turned or twisted relative to the axial centerline axis of the rotor disk, which in turn twists or turns the corresponding platform 20.

Each platform has a pair of circumferentially opposite splitlines or slash faces 44 extending obliquely between the forward and aft faces thereof in a parallelogram configuration. Each platform 20 is twisted at an acute inclination or twist angle A, about 20 degrees for example, from the axial centerline axis of the disk or the axial dovetail of the blade itself. The twisted difference in orientation between the platform 20 and the underlying dovetail 24 affects the centrifugal load path through the blade.

As initially illustrated in FIG. 3, the platform 20 includes a first half or side 46 disposed along the airfoil pressure side 32, and a circumferentially opposite second half or side 48 disposed along the airfoil suction side 34. The platform second side 48 is illustrated in more detail in FIG. 4 and includes an integral midchord damper keeper 50 disposed below the midchord of the airfoil. The keeper 50 is a locally enlarged portion of the platform along the suction-side slash face 44 which cooperates with an elongate damper 52.

Figure 4:
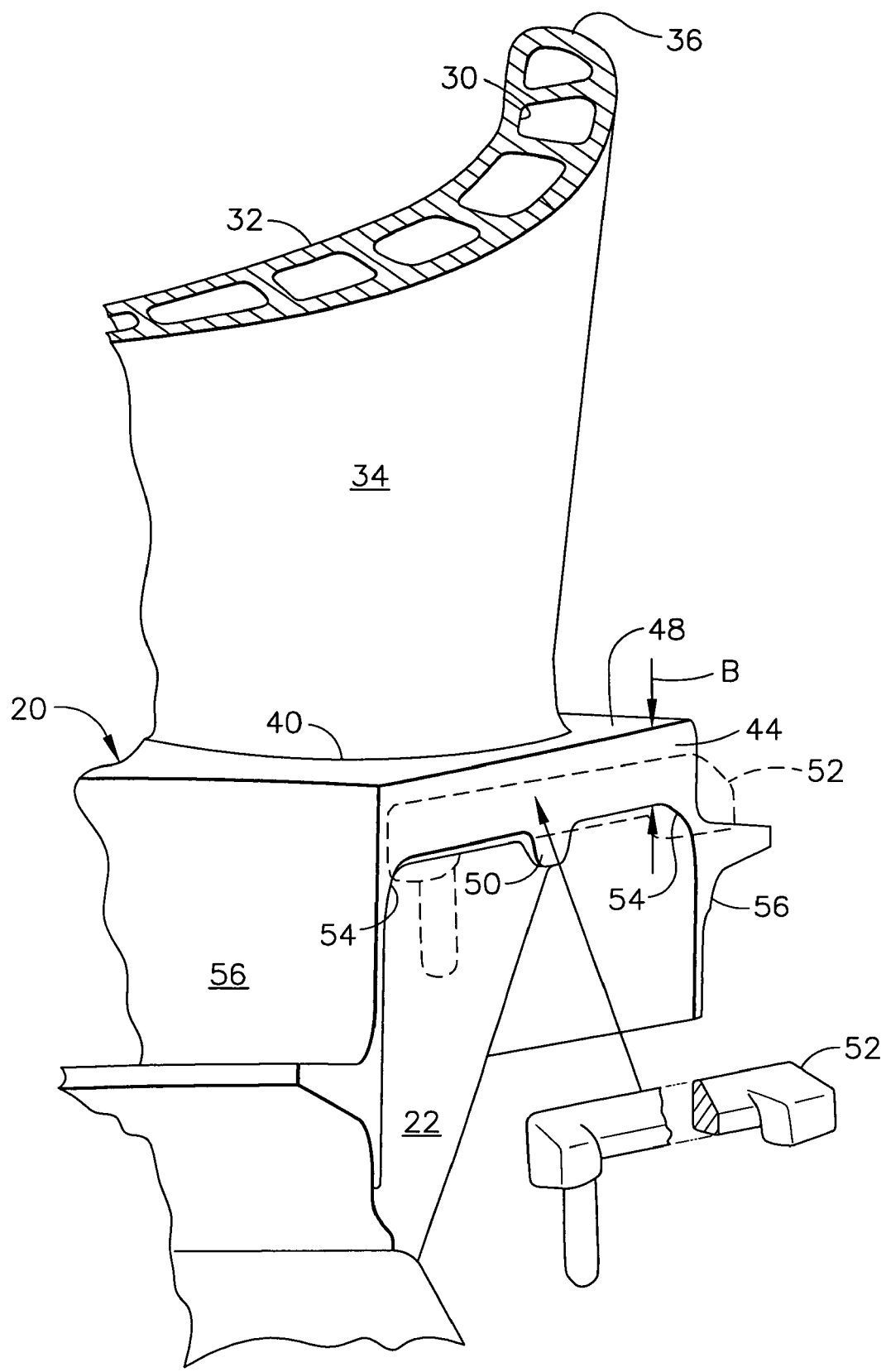
FIG. 4 is enlarged exploded view of the suction-side portion of the platform illustrated in FIG. 2 along which the damper is positioned.

The damper 52 illustrated in FIG. 4 is generally triangular in cross section and includes two enlarged end lugs one of which includes a radially extending rod or anchor. As further described hereinbelow, the damper is trapped between adjacent blade platforms, and the flat vertical or radial face of the damper frictionally engages the flat radial slash face of the suction side of the platform to frictionally dissipate vibratory energy of the blades and therefore reduce vibratory response thereof.

The locally enlarged damper keeper 50 provides additional radial surface area along the slash face to ensure that the face of the damper remains properly oriented in radial position without rotating or flipping for maximizing its damping effectiveness under centrifugal operation in the gas turbine engine.

Since weight of the entire turbine blade is a paramount design factor, weight should be reduced where possible without compromising the performance of the various portion of the blade. For example, the platform 20 itself should be as thin as possible for its intended operation, with the damper keeper 50 being merely a local increase in the thickness thereof.

The platform has a radial thickness B and is locally thinner both forward and aft from the midchord damper keeper 50, which correspondingly is radially thicker than the remainder of the platform along the slash face. Note in particular that the platform second side 48 illustrated in FIG. 4 is locally thinner at both its forward and aft ends, and is locally thick at the damper keeper 50 solely between the middle of those two ends.

The significance of this configuration is better illustrated in conjunction with FIG. 3 in which the twisted form of the platform 20 is apparent. The blade dovetail 24 is an axial entry dovetail which extends through the perimeter of the rotor disk parallel to the axial or centerline axis of that disk. The platform 20 is disposed obliquely to the axial orientation of the dovetail by the small inclination angle A.

Since the dovetail and platform have different orientations in space, the platform second side 48 overhangs the dovetail at the forward end of the platform, while the platform second side at the aft end of the platform is recessed back from the dovetail. Since the damper keeper 50 is spaced axially between the forward and aft ends of the platform, it is disposed closely adjacent to both the suction side of the airfoil and the underlying shank and dovetail of the blade with minimal length.

FIG. 4 illustrates the substantial extension or overhang of the platform second side 48 at the forward end thereof. Conventional damper keepers would typically be introduced in the platform illustrated in FIG. 4 by locally enlarged portions of the platform at both the forward and aft ends thereof (not shown). Such an enlarged damper keeper along the overhanging forward end of the platform would have considerable circumferential length and weight which must be carried through the dovetail and supporting disk during operation.

In contrast, instead of using the two conventional end damper keepers, a single damper keeper 50 is used at the midchord location. The single keeper 50 is relatively short in length and disposed closely adjacent to the suction side of the airfoil in the inflection region of the canted slash face, and is substantially shorter in length than the substantially longer conventional damper keepers which would otherwise be located under the forward and aft ends of the platform.

The short and singular damper keeper 50 substantially reduces weight of the blade platform, and correspondingly reduces the centrifugal loads therefrom which must be carried through the dovetail and supporting disk.

As shown in FIG. 4, the radially outer surface of the platform is smooth to define the inner boundary for the combustion gases. The damper keeper 50 is disposed under the platform, and extends only below the platform second side 48 obliquely or outwardly from the adjoining shank 22 where it meets the underside of the platform.

It is noted that the shank 22 is suitably contoured to effect a transition between the axially oriented dovetail 24 and the twisted airfoil and platform disposed radially thereabove. The suction side of the shank 22 meets the suction side slash face 44 at a common junction with the suction side of the airfoil near its midchord, which location ensures a minimum circumferential length of the damper keeper 50, and minimum additional weight therefrom.

In the preferred embodiment illustrated in FIG. 4, the platform second side 48 includes a planar slash face 44 which is coplanar with the exposed end of the damper keeper 50. The suction-side slash face 44 has a substantially constant or uniform thickness B between the forward and aft ends thereof, and is locally thick only at the damper keeper itself.

Furthermore, the platform second side 48 preferably blends at corresponding arcuate fillets 54 with radially extending skirts 56 extending inwardly along the opposite forward and aft ends of the supporting shank 22. The skirts 56 are conventional features from which conventional angel wing seals extend axially outwardly in opposite directions for sealing the turbine blades with adjoining stators in the gas turbine engine. The platform and integral skirts may be formed with minimum thicknesses, with the platform second side being locally thicker solely at the midchord damper keeper 50 location.

FIG. 5 illustrates the suction side of the platform 20 and the generally smooth suction-side surface of the supporting shank 22 extending therebelow between the two skirts 56. FIG. 6 illustrates the pressure-side region of the platform 20 with the platform first side 46 being complementary with the opposite platform second side of an adjoining blade and platform for trapping the damper 52 circumferentially therebetween as illustrated in more detail in FIG. 2.

The platform first side illustrated in FIG. 6 includes a corresponding planar slash face 44 preferably having a substantially uniform or constant thickness C, which is preferably less than the thickness B of the opposite slash face. The platform first side 46 is therefore thinner along its slash face than the platform second side 48 along its slash face, and the platform first side does not include the locally large damper keeper therein.

In order to trap radially the damper 52 between adjacent blades as illustrated in FIG. 1, a pair of keeper tabs or retainer shelves 58 as illustrated in FIG. 6 are spaced below the platform first side 46 between the two skirts. The two shelves 58 are spaced axially apart from each other at the opposite forward and aft ends of the shank 22 and provide an axially elongate slot in which the axially elongate damper 52 may be conveniently trapped.

The retainer shelves 58 as illustrated in FIG. 6 are preferably imperforate and as thin as practical for minimizing the additional weight corresponding thereto. The two shelves blend at corresponding fillets with the two radial skirts 56 along the shank opposite ends to form corresponding U-shaped end sockets for receiving the opposite ends of the damper.

The shelves 58 are conventional modifications of typical retainer shelves, which are thinner and imperforate without the holes typically provided for receiving supporting legs of corresponding conventional dampers.

As shown in FIG. 2, the retainer shelves 58 are sized to trap the damper 52 in the confined space between the platform first side 46 of one blade and the platform second side 48 of the next adjacent blade, with the flat face of the damper 52 being aligned radially with the slash face of the platform second side 48, which includes the integral damper keeper 50 at the midchord thereof. The single leg of the damper extends radially inwardly, and the damping face of the damper is accurately aligned with the suction-side slash face.

The introduction of the unitary damper keeper 50 on the suction-side slash face illustrated in FIG. 5 substantially reduces the weight of the blade while permitting proper operation of the damper. The platform first side 46 is made as thin as possible without the need for any damper keeper therein, with minimum thickness retainer shelves 58 being provided for trapping the damper upon assembly.

Further weight may be removed from the turbine blade initially illustrated in FIGS. 1 and 2 by additional selective thinning thereof. For example, the shank 22 includes four supporting lugs 60 extending from opposite sides of the shank adjacent the axially opposite forward and aft ends thereof for supporting a conventional seal body 62 between the blades. Since the blades are spaced circumferentially apart when mounted in the rotor disk, spaces are provided between the corresponding shanks thereof which are suitably filled by the corresponding seal bodies 62. In this way, the inter-blade spaces are suitably sealed by the corresponding seal bodies 62.

The lugs 60 are arranged in pairs on opposite sides of the blades, with FIG. 5 illustrating the two suction-side lugs 60 being disposed radially below the airfoil suction side 34, and radially above the axially extending lobes of the dovetail 24. These two suction-side lugs 60 include flat distal ends which define a pair of reference datum pads 64.

These datum pads 64 are therefore corresponding portions of the two lugs which are created upon the original casting of the blade. The two datum pads permit referencing of the entire blade relative thereto for subsequent fixturing and machining of the cast blade for final manufacturing thereof. For example, after casting, various rows of film cooling holes (not shown) are drilled through the airfoil sidewalls at precise locations which are referenced from the two datum pads 64.

The suction side of the shank 22 illustrated in FIG. 5 is smooth and relatively thin without surface discontinuity except for the introduction of the two suction-side lugs 60. In particular, the shank is smooth axially between the pair of datum pads 64, with the corresponding lugs being as small as possible for supporting the seal body during operation.

This configuration of the suction-side lugs illustrated in FIG. 5 is a substantial modification of the conventional mechanism for introducing datum pads. For example, conventional datum pads (not shown) would otherwise be introduced on the suction side of the blade illustrated in FIG. 5 by the addition of two elevated lands adjacent the inboard sides of the two lugs illustrated. These elevated lands locally increase the thickness of the shank and add weight to the blade. By eliminating these elevated lands and keeping the shank relatively thin and smooth between the two lugs 60, additional weight is removed from the blade, with the suction-side lugs 60 themselves being configured with the distal end datum pads 64 with minimal modification.

FIG. 6 illustrates the two lugs 60 extending from the shank below the airfoil pressure side 32. The shank 22 is smooth and relatively thin between these two pressure side lugs 60, and eliminates the otherwise conventional elevated land typically provided in this region for placing a permanent serial number on the individual blade. It is typical practice to mark a serial number on each turbine blade, and this is typically effected by introducing an elevated flat land (not shown) between the two pressure-side lugs 60 illustrated in FIG. 6.

By eliminating the serial number land the shank is further selectively thinned for additionally reducing weight of the blade. The serial number is instead located on the underside of the aft angel wing in another conventional practice.

As indicated above with respect to FIG. 1, the airfoil 18 is hollow and includes a surrounding sidewall along the pressure and suction sides 32,34 with corresponding ribs or partitions extending therebetween to define the radial channels of the cooling circuit. Additional weight may be removed from the blade by contouring the sidewalls of the airfoil to decrease in average thickness D from the root 40 to the tip 42.

For example, the average thickness of the airfoil may be about 37 mils at the airfoil root decreasing to about 28 mils at the airfoil tip which is a substantial reduction in sidewall thickness and corresponding weight as compared to conventional practice of tapering sidewall thickness.

Reduced sidewall thickness correspondingly reduces the centrifugal loads during operation with less loads being carried through the dovetail into the supporting disk. And, this exemplary second stage turbine blade may be operated at reduced rotational speed for correspondingly reducing the centrifugal loads and stresses therefrom notwithstanding the reduction in thickness of the airfoil.

As shown in FIG. 1, the dovetail 24 is a conventional axial-entry type dovetail with several pairs of tangs or lobes in the typical fir tree configuration. The dovetail is mounted in the complementary axial dovetail slot 12 in the perimeter of the rotor disk 10, and the centrifugal loads generated during operation from the individual blades are carried through the corresponding dovetails and into the disk posts 14 around the perimeter of the disk 10.

In view of the substantial reduction in weight of the individual blades due to the singular midchord damper keepers 50, elimination of datum lands by the substitution of the corresponding suction side lugs and datum pads 64, elimination of the serial number land, and the reduced thickness of the tapering sidewalls of the airfoil, less centrifugal load is carried by the supporting disk. Accordingly, the strength requirements for that disk may be correspondingly reduced and a significantly less expensive disk may be used.

For example, the disk 10 may now be constructed as a forged metal disk at correspondingly reduced cost as compared with typical state-of-the-art powdered-metal rotor disks. The forged metal disk has sufficient strength for carrying the reduced-weight turbine blades without comprising performance, durability, or life of the turbine stage.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
an airfoil, platform, shank, and multilobed axial dovetail integrally joined together in turn;
said airfoil including opposite pressure and suction sides extending in chord between leading and trailing edges and in span between a root at said platform and an outer tip;
said platform including a first side disposed along said airfoil pressure side, and an opposite second side disposed along said airfoil suction side;
said platform second side includes an integral damper keeper below the midchord of said airfoil, and is locally thinner at forward and aft ends of said platform second side; and
said platform second side blends at corresponding fillets with radial skirts along opposite ends of said shank.

2. A blade according to claim 1 wherein said platform is disposed obliquely to said dovetail, with said platform second side overhanging said dovetail at said forward end, and being recessed back from said dovetail at said aft end, and said keeper being spaced axially therebetween.

3. A blade according to claim 2 wherein:
said platform first side includes a planar first slash face having a substantially uniform thickness between said forward and aft ends;
said platform second side includes a planar second slash face being coplanar with said keeper, and said second slash face has a substantially uniform thickness between said forward and aft ends; and
said first slash face is thinner than said second slash face.

4. A blade according to claim 3 wherein said keeper extends below said platform second side integrally from said shank.

5. A blade according to claim 4 further comprising a pair of retainer shelves spaced below said platform first side and spaced apart from each other at opposite ends of said shank.

6. A blade according to claim 5 wherein said retainer shelves are imperforate, and blend at corresponding fillets with said skirts along said shank opposite ends.

7. A blade according to claim 6 wherein:
shank includes four lugs extending from opposite sides of said shank adjacent opposite forward and aft ends thereof for supporting a seal body;
two of said lugs are disposed below said airfoil suction side, and include flat distal ends defining a pair of reference datum pads;
two of said lugs are disposed below said airfoil pressure side; and
said shank is smooth between said two pressure-side lugs and between said two suction-side lugs.

8. A blade according to claim 7 wherein said airfoil is hollow, and includes a surrounding sidewall along said pressure and suction sides decreasing in average thickness from said root to said tip.

9. A blade according to claim 8 wherein said dovetail is mounted in an axial dovetail slot in the perimeter of a rotor disk, and said disk comprises forged metal.

10. A pair of said turbine blades according to claim 8 adjoining each other at said platform first side of one blade and said platform second side of the other blade, with a blade damper being trapped therebetween in frictional abutment with said damper keeper.

11. A turbine blade comprising:
an airfoil, platform, shank, and dovetail integrally joined together in turn;
said airfoil including opposite pressure and suction sides extending in chord between leading and trailing edges and in span between a root at said platform and an outer tip;
said platform including a first side disposed along said airfoil pressure side, and an opposite second side disposed along said airfoil suction side; and
said platform second side includes an integral damper keeper below the midchord of said airfoil, and is locally thinner at forward and aft ends of said platform second side.

12. A blade according to claim 11 wherein said platform is disposed obliquely to said dovetail, with said platform second side overhanging said dovetail at said forward end, and being recessed back from said dovetail at said aft end, and said keeper being spaced axially therebetween.

13. A blade according to claim 12 wherein said keeper extends below said platform second side outwardly from said shank.

14. A blade according to claim 13 wherein said platform second side further includes a planar slash face being coplanar with said keeper, and said slash face has a substantially uniform thickness between said forward and aft ends.

15. A blade according to claim 14 wherein said platform second side blends at corresponding fillets with skirts along opposite ends of said shank.

16. A blade according to claim 13 wherein said platform first side includes a planar slash face having a substantially uniform thickness between said forward and aft ends.

17. A blade according to claim 16 further comprising a pair of retainer shelves spaced below said platform first side and spaced apart from each other at opposite ends of said shank.

18. A blade according to claim 17 wherein said retainer shelves are imperforate, and blend at corresponding fillets with skirts along said shank opposite ends.

19. A blade according to claim 13 wherein said shank includes four lugs extending from opposite sides of said shank adjacent opposite forward and aft ends thereof for supporting a seal body.

20. A blade according to claim 19 wherein:
two of said lugs are disposed below said airfoil suction side, and include flat distal ends defining a pair of reference datum pads ; and
said shank is smooth between said pair of pads.

21. A blade according to claim 20 wherein:
two of said lugs are disposed below said airfoil pressure side; and
said shank is smooth between said two pressure-side lugs.

22. A blade according to claim 13 wherein said airfoil is hollow, and includes a surrounding sidewall along said pressure and suction sides decreasing in average thickness from said root to said tip.

23. A blade according to claim 13 wherein said dovetail is mounted in an axial dovetail slot in the perimeter of a rotor disk, and said disk comprises forged metal.

24. A pair of said turbine blades according to claim 13 adjoining each other at said platform first side of one blade and said platform second side of the other blade, with a blade damper being trapped therebetween in frictional abutment with said damper keeper.

25. A turbine blade comprising:
an airfoil, platform, shank, and dovetail integrally joined together in turn;
said airfoil including opposite pressure and suction sides extending in chord between leading and trailing edges and in span between a root at said platform and an outer tip;
said platform including a first side disposed along said airfoil pressure side, and an opposite second side disposed along said airfoil suction side; and said platform second side includes an integral damper keeper below the midchord of said airfoil, and is locally thinner from said keeper to forward and aft ends of said platform second side.

26. A blade according to claim 25 wherein said platform second side further includes a planar slash face being coplanar with said keeper, and said slash face has a substantially uniform thickness from said keeper to said forward and aft ends.

27. A blade according to claim 26 wherein said platform second side blends at corresponding fillets between said keeper and corresponding skirts extending along opposite forward and aft ends of said shank.

* * * * *